US011712770B2

(12) United States Patent
Morimura et al.

(10) Patent No.: US 11,712,770 B2
(45) Date of Patent: Aug. 1, 2023

(54) MACHINE TOOL

(71) Applicant: OKUMA Corporation, Aichi (JP)

(72) Inventors: Shoichi Morimura, Aichi (JP); Yuichi Tazuke, Aichi (JP)

(73) Assignee: OKUMA CORPORATION, Aichi (JP)

( * ) Notice: Subject to any disclaimer, the term of this patent is extended or adjusted under 35 U.S.C. 154(b) by 44 days.

(21) Appl. No.: 16/773,223

(22) Filed: Jan. 27, 2020

(65) Prior Publication Data
US 2020/0238466 A1    Jul. 30, 2020

(30) Foreign Application Priority Data
Jan. 28, 2019    (JP) ................. 2019-012469

(51) Int. Cl.
*B23Q 3/155*    (2006.01)
*B23Q 3/157*    (2006.01)
*B23Q 11/00*    (2006.01)

(52) U.S. Cl.
CPC ....... *B23Q 3/1554* (2013.01); *B23Q 3/15513* (2013.01); *B23Q 3/15713* (2013.01);
(Continued)

(58) Field of Classification Search
CPC ......... Y10T 483/1705; Y10T 483/1748; Y10T 483/176; Y10T 483/1752; Y10T 483/1755; Y10T 483/1776; Y10T 483/1783; Y10T 483/1786; Y10T 483/1788; Y10S 483/901; B23Q 3/15513; B23Q 3/15713; B23Q 3/15773; B23Q 3/1578; B23Q 2003/155047; B23Q 2003/155411; B23Q 2003/155418–155449
(Continued)

(56) References Cited

U.S. PATENT DOCUMENTS 3,990,585 A * 11/1976 Johansson ............ B23Q 3/1554
483/68
5,214,829 A    6/1993 Minagawa
(Continued)

FOREIGN PATENT DOCUMENTS

DE          19510498 A1 *  9/1996   ........... B23Q 3/1554
DE       102006015101 A1 * 11/2006   ......... B23Q 11/0891
(Continued)

OTHER PUBLICATIONS

EPO Machine Translation of JP-05-285766-A (JP 766)—"Automatic Tool Replacing Device of Machine Tool"; Nov. 2, 1993.*
(Continued)

*Primary Examiner* — Erica E Cadugan
*Assistant Examiner* — Michael Vitale
(74) *Attorney, Agent, or Firm* — Cantor Colburn LLP

(57) ABSTRACT

A machine tool includes a lower tool post for holding a cutting tool, a tool main spindle for holding a cutting tool, a storage unit capable of storing the cutting tool, an exchange mechanism for exchanging the cutting tools between the tool main spindle and the storage unit, an inside robot for exchanging the cutting tools between the lower tool post and the tool main spindle, and a controller. The controller performs control such that the cutting tools are exchanged between the lower tool post and the storage unit via the inside robot, the tool main spindle, and the exchange mechanism.

5 Claims, 15 Drawing Sheets

(52) U.S. Cl.
CPC .............. *B23Q 11/0042* (2013.01); *B23Q 2003/155418* (2016.11); *Y10S 483/901* (2013.01); *Y10T 483/115* (2015.01); *Y10T 483/1705* (2015.01); *Y10T 483/1755* (2015.01); *Y10T 483/1776* (2015.01); *Y10T 483/1783* (2015.01)

(58) Field of Classification Search
USPC ........ 483/18, 36, 38, 39, 40, 41, 48, 51, 52, 483/53, 901
See application file for complete search history.

(56) References Cited

U.S. PATENT DOCUMENTS

| | | | | |
|---|---|---|---|---|
| 6,059,702 | A * | 5/2000 | Winkler | B23Q 3/157 408/56 |
| 6,409,641 | B1 * | 6/2002 | Hashimoto | B23Q 3/1552 408/56 |
| 6,640,677 | B2 * | 11/2003 | Ueda | B23B 3/06 29/27 C |
| 7,033,308 | B2 * | 4/2006 | Fujimoto | B23Q 3/15706 409/137 |
| 7,103,955 | B2 * | 9/2006 | Murai | B23Q 7/045 29/418 |
| 7,172,542 | B2 * | 2/2007 | Sato | B23Q 3/1552 15/405 |
| 8,052,588 | B2 * | 11/2011 | Amaya | B23Q 3/15503 483/63 |
| 8,092,357 | B1 * | 1/2012 | Buus | B23Q 7/045 483/41 |
| 9,238,287 | B2 * | 1/2016 | Gardner | B23Q 11/1076 |
| 2003/0134731 | A1 * | 7/2003 | Komine | B23Q 3/15746 483/27 |
| 2013/0178347 | A1 | 7/2013 | Tsuchiya | |
| 2016/0067840 | A1 | 3/2016 | Fujimoto et al. | |
| 2016/0339553 | A1 | 11/2016 | Nakazawa | |
| 2017/0326700 | A1 * | 11/2017 | Morimura | B23Q 11/0075 |
| 2017/0329316 | A1 * | 11/2017 | Morimura | B25J 15/0028 |
| 2018/0050432 | A1 * | 2/2018 | Morimura | B23Q 1/766 |
| 2018/0126567 | A1 | 5/2018 | Morimura | |
| 2018/0250809 | A1 * | 9/2018 | Morimura | B25J 17/00 |

FOREIGN PATENT DOCUMENTS

| | | | | |
|---|---|---|---|---|
| FR | 2115764 | A5 * | 7/1972 | ........ B23Q 3/15539 |
| JP | 58223543 | A * | 12/1983 | ........ B23Q 3/15773 |
| JP | 62277249 | A * | 12/1987 | ........ B23Q 3/15536 |
| JP | 63062636 | A * | 3/1988 | ............ B23Q 11/08 |
| JP | H04283003 | A | 10/1992 | |
| JP | H07001207 | A | 1/1993 | |
| JP | H05285766 | A | 11/1993 | |
| JP | 2007075922 | A | 3/2007 | |
| JP | 2013141727 | A | 7/2013 | |
| JP | 2016055370 | A | 4/2016 | |
| JP | 2016215343 | A | 12/2016 | |
| JP | 2018020402 | A | 2/2018 | |
| JP | 6321309 | B1 * | 5/2018 | ........ B23Q 3/15526 |

OTHER PUBLICATIONS

JPO Notiice of Reasons for Refusal for corresponding JP Application No. 2019-012469; dated Nov. 15, 2022.

* cited by examiner

MACHINE TOOL

CROSS REFERENCE TO RELATED APPLICATION

The present application claims priority under 35 U.S.C. § 119 to Japanese Patent Application No. 2019-012469 filed on Jan. 28, 2019, the entire contents of which are incorporated herein by reference.

TECHNICAL FIELD

This specification relates to a machine tool for machining a workpiece, using a cutting tool.

BACKGROUND

A machine tool for machining a workpiece by means of a cutting tool is equipped with a holding device for holding various tools (a cutting tool or a tailstock tool), such as a tool post or a tool main spindle that holds a cutting tool, or a tailstock that holds a tailstock tool.

In such a holding device, a tool to be held is exchanged, for example, depending on the type of machining to be executed or the kind of a workpiece to be machined. In the above, tool exchange by a robot, instead of an operator, is suggested.

For example, Patent Document 1 discloses an automatic tool exchanger equipped with a robot arm, and a moving mechanism for moving the robot arm for automatic exchange of tools to be mounted on the lower tool post of a machine tool. According to Patent Document 1, the moving mechanism includes, for example, a linear guide and a servo motor for moving the robot arm between a tool stocker and a main spindle. The robot arm has a gripper for removably gripping a tool.

Patent Document 2 discloses a tool-carrying device equipped with a six-axial joint robot, and a tool-exchanging hand mounted on the wrist of the robot. According to Patent Document 2, the robot moves the tool-exchanging hand between a tool post and a tool storage, and automatically exchanges tools to be mounted on the tool post. Further, Patent Document 2 discloses exchange of chucks, using the tool-carrying device, in addition to tools.

Such a technique for exchanging tools using a robot significantly reduces a burden imposed on an operator.

CITATION LIST

Patent Literature

PATENT DOCUMENT 1: JP 2016-55370 A
PATENT DOCUMENT 2: JP H 05-285766 A

Unfortunately, conventional exchange of tools using a robot requires installation of a tool-holding device (for example, a tool post or a tailstock) and a tool storage within a range where the robot can move. This requirement may impose restriction on the layout of these devices. Although setting a larger robot-movable range can naturally enhance the degree of freedom in laying out the tool-holding device and the storage, such an enlarged robot movable area increases the number of issues requiring consideration, such as how to avoid interference between a robot and other members.

In view of the above, this specification discloses a machine tool capable of automatic exchange of tools for a variety of tool-holding devices while avoiding excessive enlargement of a range where a robot can move.

SUMMARY

A machine tool disclosed in this specification is a machine tool for machining a workpiece, by means of a cutting tool, the machine tool including: a first holding device installed in a machining chamber, the first holding device being for holding a tool; a second holding device installed in the machining chamber, the second holding device being for holding the tool; a storage unit for storing one or more tools; an exchange mechanism for exchanging the tools between the second holding device and the storage unit, the exchange mechanism being unable to directly access the first holding device; a robot for exchanging the tools between the first holding device and the second holding device; and a controller for controlling driving of the first holding device, the second holding device, the exchange mechanism, and the robot, wherein the controller performs control such that the tools are exchanged between the first holding device and the storage unit via the robot, the second holding device, and the exchange mechanism.

In this case, the second holding device may be a tool main spindle or a tool post that holds a cutting tool as the tool, and the exchange mechanism may be an automatic tool changer including at least one of an exchange arm and a robot arm.

The first holding device may be a tool post that holds a cutting tool as the tool. The first holding device may be a workpiece main spindle that holds a chuck claw as the tool. The first holding device may be a tailstock that holds a tailstock tool as the tool.

The second holding device may hold a tool dedicated to the first holding device via a tool connecter having the same shape as the tool mount of the first holding device and a machine connector adapted to be mounted on the tool mount of the second holding device.

The machine tool may further include a cleaning mechanism for cleaning around the tool held on the first holding device, and the controller may cause the cleaning mechanism to clean around the tool prior to exchange of tools between the first holding device and the storage unit.

The robot may include a main body and one or more end effecters exchangeably mounted on the main body. The end effecter to be mounted on the robot may be selected from a group including an end effecter for gripping an object and an end effecter for cleaning around the tool held on the first holding device.

According to the machine tool disclosed in this specification, automatic exchange of tools is achieved also with respect to the first holding device without excessive enlargement of the movable range of the robot.

BRIEF DESCRIPTION OF DRAWINGS

Embodiment(s) of the present disclosure will be described based on the following figures, wherein.

DESCRIPTION OF EMBODIMENTS

Figure 1:
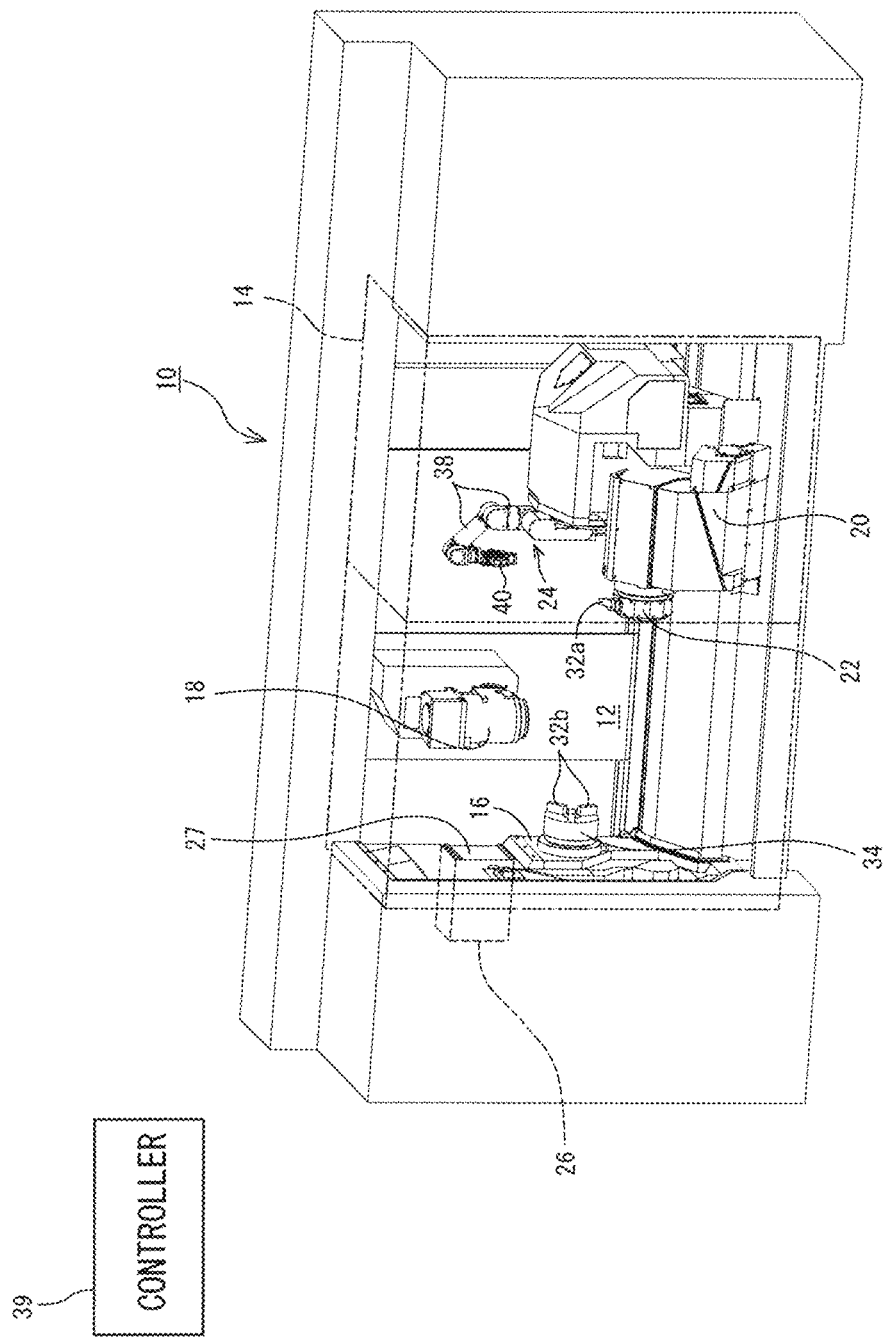
FIG. 1 is a perspective view of a machine tool.
Figure 2:
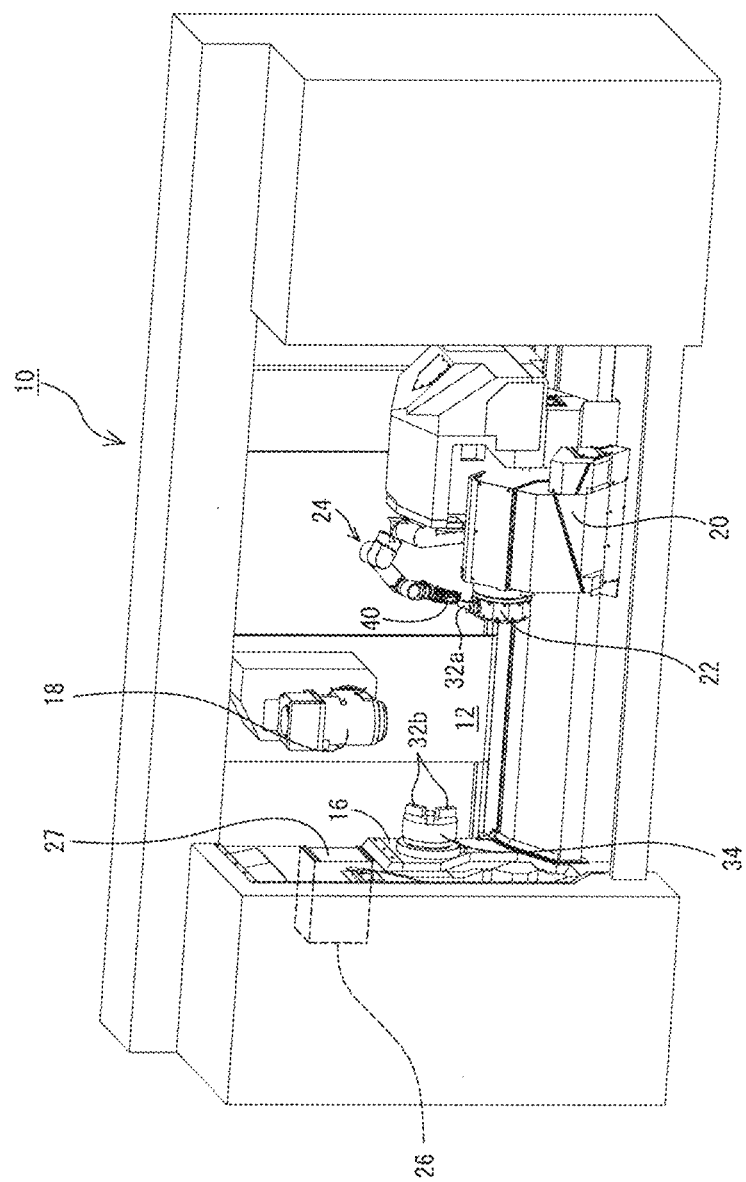
FIG. 2 is a perspective view of a machine tool.
Figure 3:
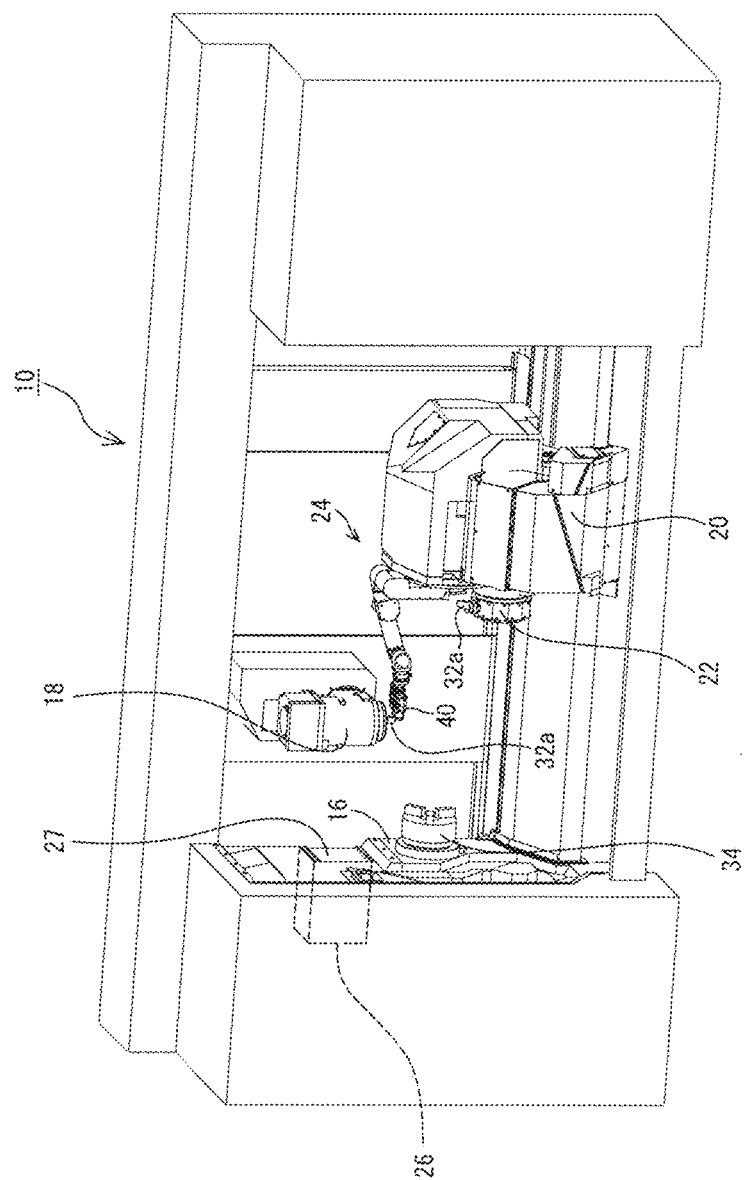
FIG. 3 is a perspective view of a machine tool.
Figure 4:
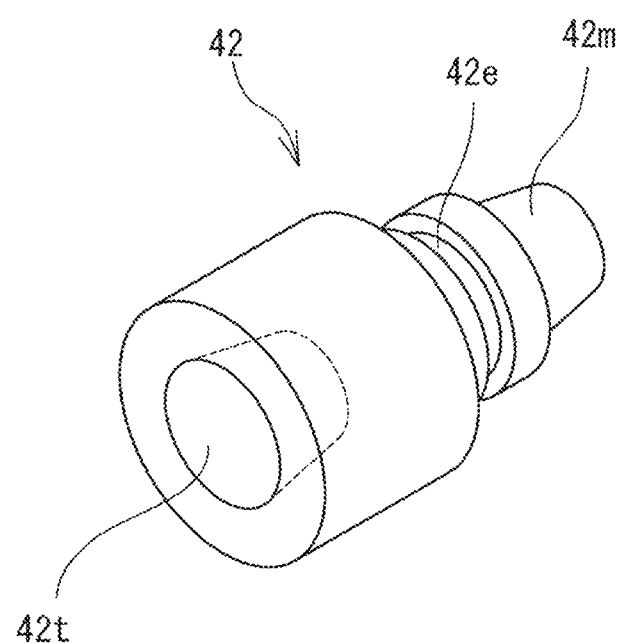
FIG. 4 illustrates one example of a tool holder.
Figure 5:
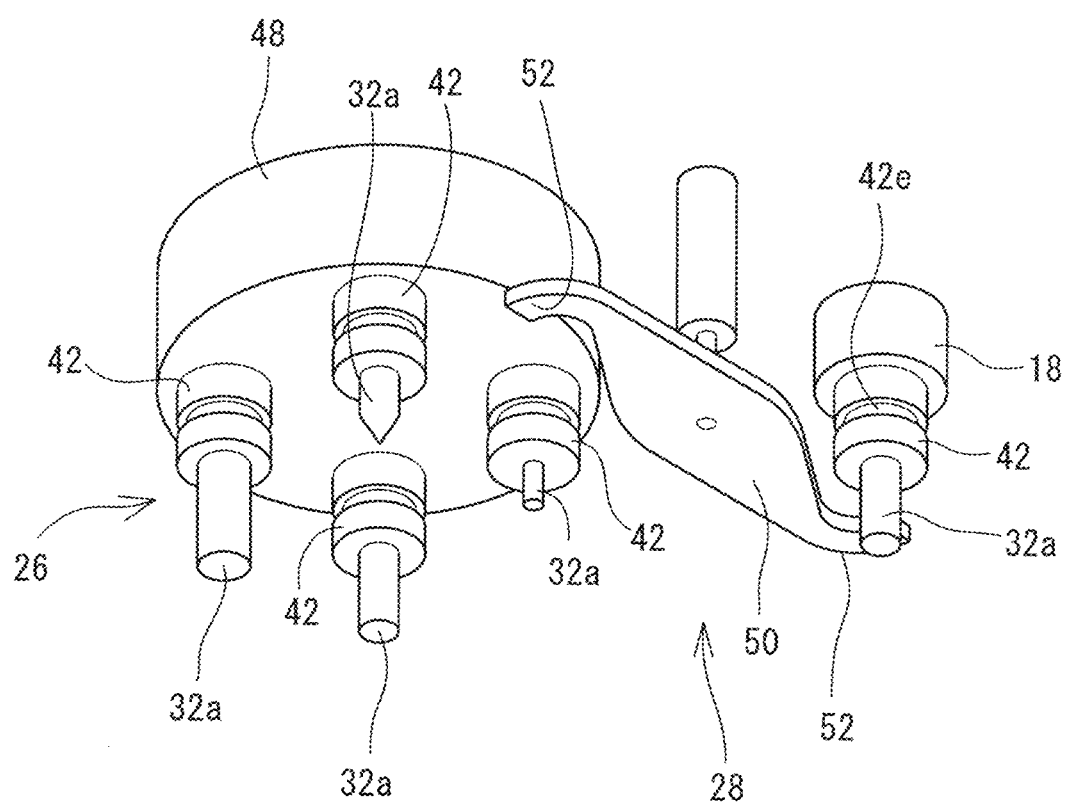
FIG. 5 illustrates one example of an exchange mechanism.
Figure 6:
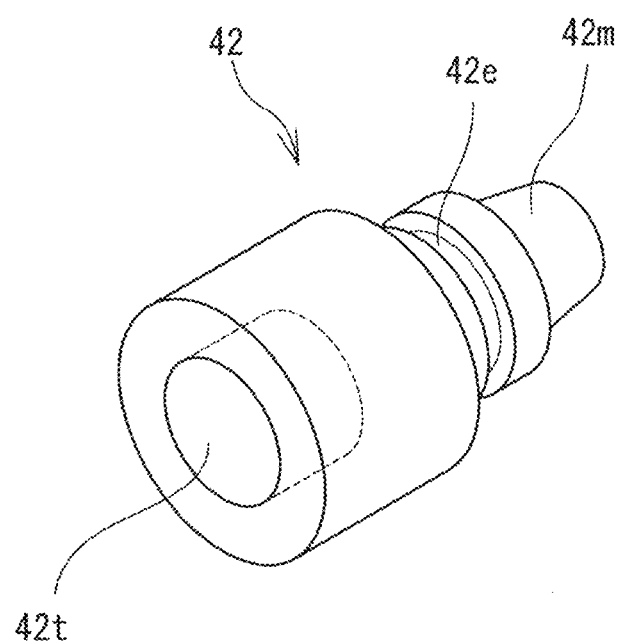
FIG. 6 illustrates another example of a tool holder.

The structure of a machine tool 10 will now be described while referring to the drawings. FIG. 1 to FIG. 3 are perspective views of the machine tool 10, illustrating exchange of a cutting tool 32a, or one kind of a tool 32. FIG. 4 and FIG. 6 illustrate examples of a tool holder 42. FIG. 5 illustrates one example of an exchange mechanism 28.

The machine tool 10 is a cutting machine for cutting a workpiece (not illustrated) with the cutting tool 32a. More specifically, the machine tool 10 in this embodiment is a multi-task machine equipped with a tool main spindle 18 that is mainly used in rotating and a lower tool post 20 that is mainly used in turning. Note that the machine tool 10 disclosed here is merely one example, and the technique disclosed in this specification is applicable to any other types of machine tools 10.

A machining chamber 12 of the machine tool 10 is covered. The machining chamber 12 has a large opening on its front surface. The opening is to be opened and closed with a front door 14. An operator accesses the respective units in the machining chamber 12 through the opening. During machining, the front door 14 provided to the opening is kept closed to ensure security and an appropriate environment.

The machine tool 10 has a workpiece main spindle 16 that rotatably holds one end portion of a workpiece. The workpiece main spindle 16 can rotate by means of a motor, not illustrated. On an end face of the workpiece main spindle 16; that is, a main spindle end 34, a plurality of chuck claws 32b for removably holding a workpiece are mounted. Specifically, the plurality of chuck claws 32b are equidistantly disposed in the circumferential direction, and can move in the radial direction.

As described above, the machine tool 10 includes the lower tool post 20 and the tool main spindle 18 as well. The lower tool post 20 holds a cutting tool 32a, or one kind of a tool 32, and functions as a first holding device, which cannot be directly accessed by the exchange mechanism 28, which will be described later (not illustrated in FIG. 1 to FIG. 3). This tool post is movable in the Z axial direction, or a direction parallel to the axis of a workpiece. The tool post is movable also in a direction parallel to the X axis, or the radial direction of a workpiece. In this embodiment, the X axis is inclined upward relative to the horizontal direction as it goes farther away from the opening of the machine chamber 12 in the direction opposite the opening.

On the end face of the lower tool post 20 in the Z direction, a turret 22 capable of holding a plurality of cutting tools 32a is mounted. The turret 22 is polygonal when viewed in the direction of the Z axis, and can rotate about an axis parallel to the Z axis as a center. On the circumferential surface of the turret 22, there are mounted a plurality of tool mounts where cutting tools 32a are to be mounted. Rotating the turret 22 enables exchange of the cutting tools 32a to be used in machining.

Note that the cutting tool 32a to be held on the lower tool post 20 (including the turret 22) may be a turning tool for use in turning or a rotating tool for use in rotating. In either case, the cutting tool 32a to be held on the lower tool post 20 is exchanged via an inside robot 24, the tool main spindle 18, and the exchange mechanism 28.

The tool main spindle 18 rotatably holds the cutting tool 32a, or one kind of a tool, and functions as a second holding device that can be directly accessed by the exchange mechanism 28. The tool main spindle 18 is movable in three axial directions, and has a movable range that allows the tool main spindle 18 to access a workpiece held by at least the inside robot 24 to be described later, the exchange mechanism 28, and the workpiece main spindle 16. In addition, on an end face of the tool main spindle, there is mounted a tool mount where the cutting tool 32a is to be mounted.

The cutting tool 32a to be held on the tool main spindle 18 as well may be a turning tool for use in turning or a rotating tool for use in rotating. In either case, the cutting tool 32a to be held on the tool main spindle 18 is exchanged by the exchange mechanism 28 without intervention of the inside robot 24.

Both the lower tool post 20 and the tool main spindle 18 may hold the cutting tool 32a either directly or via the tool holder 42. In the following it is assumed, for simplicity of description, that the tool mount of the lower tool post 20 has the same shape as the tool main shape 18, and that both the lower tool post 20 and the tool main spindle 18 hold the cutting tool 32a via the tool holder 42, illustrated in FIG. 4.

This tool holder 42 includes a machine connector 42m to be connected to a machine that is either the lower tool post 20 or the tool main spindle 18, a tool connecter 42t to be connected to the cutting tool 32a (the tool 32), and an engagement unit 42e to be engaged with an exchange arm 50 of the exchange mechanism 28, to be described later. The machine connector 42m has a shape in accordance with the tool mounts of the tool main spindle 18 and the lower tool post 20. Specifically, the machine connector 42m may have a shape in accordance with a general standard, such as a tapered shank shape. The tool connecter 42t is a member to be connected to the cutting tool 32a, and can be properly changed depending on the shape of the cutting tool 32a wished to be used. The engagement unit 42e may have any shape without limitation, provided that the shape allows engagement with the exchange arm 50. For example, the engagement unit 42e may be a circumferentially extending groove, as illustrated in FIG. 4. The engagement unit 42e may include a hole, a projection, or a notch, for example, in addition to, or in place of, the groove.

The machine tool 10 further includes the inside robot 24, a storage unit 26, and the exchange mechanism 28 (refer to FIG. 5). The inside robot 24 is a robot installed in the machining chamber 12. In this embodiment, the inside robot 24 is a serial multiple joint arm robot including a plurality of robot arms 38 serially connected in one string via joints. The main body of the inside robot 24, including a plurality of robot arms 38, has an end effecter 40, which is exchangeably mounted thereon. The end effecter 40 has a specific function and is to be mounted on a robot. Examples of such an end effecter 40 include a gripping member for gripping the tool 32 (for example, a gripper or a hand mechanism), a sensor for detecting physical quantities, such as temperature or vibration, a roller for supporting a workpiece being machined, and a cleaning mechanism for cleaning an object. Examples of the cleaning mechanism include a fluid ejecting nozzle for ejecting fluid, such as cutting oil or air, a brush or a scraper for removing foreign matters, and a suction nozzle for sucking foreign matters. The end effecter 40 to be mounted on the inside robot 24 is properly selected from a group including a gripping member and a cleaning mechanism, depending on the progress of various kinds of processing by the machine tool 10.

The inside robot 24 is movable in the Z axial direction, and the angles of the respective robot arms 38 are freely changeable. With the inside robot 24 moving in the Z axial direction or the angles of the robot arms 38 being changed, the position of the end effecter 40 is thereby changed. In this embodiment, the inside robot 24 has a movable range that allows its end effecter 40 to access the tool main spindle 18 (the second holding device) and the lower tool post 20 (the first holding device). Note that it may be the case that the movable range does not allow the end effecter 40 to access the exchange mechanism 28.

The storage unit 26 is a member in which various kinds of tools 32 are stored. In this embodiment, the storage unit 26 is provided inside the machine tool 10. More specifically, as illustrated in FIG. 1 to FIG. 3, the storage unit 26 is provided inside relative to the wall surface from which the workpiece main spindle 16 projects. The storage unit 26 is closed with a shutter 27 when the tool 32 is not interacting with the outside.

Near the storage unit 26, the exchange mechanism 28 is installed. The exchange mechanism 28 exchanges the tools 32 between the storage unit 26 and the tool main spindle 18 (the second holding device). As the exchange mechanism 28, an automatic tool changer (hereinafter abbreviated as "ATC") conventionally provided to the machine tool 10 can be used.

The ATC is a device for automatically exchanging a cutting tool held on the tool main spindle, for example, in the machine tool 10. As the exchange mechanism 28 in this embodiment, the structure of the ATC can be used. For example, as illustrated in FIG. 5, the exchange mechanism 28 may have the exchange arm 50 to be engaged with, to thereby hook, the engagement unit 42e of the tool holder 42.

Steps for exchanging the cutting tools 32a to be held on the tool main spindle 18, by means of the exchange arm 50 illustrated in FIG. 5, will be briefly described. In this case, the exchange arm 50 has engagement hooks 52 for engagement with the engagement unit 42e of the tool holder 42m, each on one of its both end portions. The exchange arm 50 is rotatable around a vertical axis and elevatable in the vertical direction. In this case, the storage unit 26 has a tool magazine 48 for holding a plurality of cutting tools 32a via the respective tool holders 42. The tool magazine 48 can rotate about a vertical axis.

In exchanging the cutting tools 32a, the tool holder 42 (including the cutting tool 32a) mounted on the tool main spindle 18 and a tool holder 42 (including the cutting tool 32a) wished to be freshly mounted on the tool main spindle 18 are both positioned on the rotation track of the engagement hook 52. Then, the exchange arm 50 is rotated in one direction to have the engagement hook 52 engaged with the respective engagement units 42e of the tool holders 42. With the exchange arm 50 engaged with the two tool holders 42, the exchange arm 50 descends to thereby pull out the two tool holders 42 from the tool magazine 48 and the tool main spindle 18, respectively. Then, the exchange arm 50 is rotated again in one direction by 180° to thereby exchange the positions of the two tool holders 42. Then, the exchange arm 50 ascends to thereby insert the two tool holders 42 into the tool magazine 48 and the tool main spindle 18, respectively. This completes exchange of the cutting tools 32a. Note that the above-described structure of the exchange mechanism 28 is merely one example, and other mechanisms may be used instead.

A controller 39 controls driving of the above-mentioned workpiece main spindle 16, lower tool post 20, tool main spindle 18, inside robot 24, and exchange mechanism 28, and includes, for example, a processor for executing various operations and a memory for storing various programs and data. The controller 39 may include, for example, a numerical controller. The controller 39 controls driving of the workpiece main spindle 16, the lower tool post 20, and the tool main spindle 18, based on a machining program (an NC program) inputted by an operator to machine a workpiece. In addition, the controller 39 performs control such that the cutting tools 32a are exchanged between the lower tool post 20 and the storage unit 26 via the inside robot 24, the tool main spindle 18, and the exchange mechanism 28. This will be described below in detail.

As described above, the machine tool 10 in this embodiment has the exchange mechanism 28 for exchanging the cutting tools 32a to be mounted on the tool main spindle 18. Provision of the exchange mechanism 28 enables automatic exchange of the cutting tool 32a to be mounted on the tool main spindle 18. In contrast, the cutting tool 32a to be mounted on the lower tool post 20 cannot be exchanged directly by the exchange mechanism 28, as the lower tool post 20 is positioned remotely from the exchange mechanism 28.

In order to address this problem, one possibility is installation of an additional exchange mechanism 28 and an additional storage unit 26 near the lower tool post 20. In this case, however, an increase in cost and dimensions of the machine tool 10 will result. Similarly, although another possibility is enlargement of the range where the inside robot 24 can move so that the inside robot 24 can carry the cutting tool 32a from the storage unit 26 to the lower tool post 20 or from the lower tool post 20 to the storage unit 26, in this case, with an enlarged movable range of the inside robot 24, the problem of an increased cost is inevitable. In addition, enlargement of the movable range, following an increase in dimension of the inside robot 24, may be impossible because of interference within the machining chamber.

In view of the above, in this embodiment exchange of the cutting tools 32a between the lower tool post 20 (the first holding device) and the storage unit 26 is achieved with intervention of the inside robot 24, the tool main spindle 18 (the second holding device), and the exchange mechanism 28. In the following, an operation for storing, in the storage unit 26 for exchange, of the cutting tool 32a mounted on the lower tool post 20 will be specifically described.

Initially, the controller 39 drives the inside robot 24 to clean around the cutting tool 32a on the lower tool post 20, the cutting tool 32a being to be exchanged. In the above, a cleaning mechanism (for example, a fluid ejecting nozzle or a brush) is mounted on the inside robot 24 as the end effecter 40. Then, the controller 39 drives the inside robot 24 to demount the cutting tool 32a together with the tool holder 42 from the lower tool post 20. In the above, a gripping mechanism is mounted on the inside robot 24 as the end effecter 40.

Further, the controller 39 drives the inside robot 24 to mount on the tool main spindle 18 the cutting tool 32a having been demounted from the lower tool post 20. In the above, if necessary, the controller 39 has moved the tool main spindle 18 to within the movable range of the inside robot 24. Then, the controller 39 moves the tool main spindle 18 to a predetermined main spindle-side exchange position. Then, the controller 39 opens the shutter 27 of the storage unit 26, and stores the cutting tool 32a on the tool main spindle 18 (that is, the cutting tool 32a demounted from the lower tool post 20), in the storage unit 26, using the exchange arm 50 of the exchange mechanism 28. Simultaneously, the cutting tool 32a to be freshly mounted on the lower tool post 20 is mounted on the tool main spindle 18, by means of the exchange arm 50.

With the cutting tool 32a freshly mounted on the tool main spindle 18, the controller 39 moves the tool main spindle 18 to inside the movable range of the inside robot 24, and then drives the inside robot 24 to mount, on the lower tool post 20, the cutting tool 32a on the tool main spindle 18. This completes exchange of the cutting tools 32a between the lower tool post 20 and the storage unit 26.

As is obvious from the above description, in this embodiment, the tool main spindle 18 intervenes exchange of the cutting tools 32a between the storage unit 26 and the lower tool post 20, which are disposed remotely from each other. As the tool machine 10 has the exchange mechanism 28 for exchanging the cutting tools 32a to be mounted on the tool main spindle 18, intervention of the tool main spindle 18 enables exchange of tools between the lower tool post 20 and the storage unit 26 without provision of an additional exchange mechanism 28. Consequently, automatic exchange of tools can be achieved also with respect to the first holding device (the lower tool post 20), which is disposed remotely from the storage unit 26, while preventing increase in cost and dimensions.

In the above description, the tool mount of the tool main spindle 18 has the same shape as the lower tool post 20. Alternatively, the tool mount of the tool main spindle 18 may have a different shape from the lower tool post 20. In this case, the tool main spindle 18 uses the tool holder 42 illustrated in FIG. 6 in holding the cutting tool 32a to be mounted on the lower tool post 20. Specifically, the tool connecter 42t of the tool holder 42 has the same shape as the lower tool post 20 (the first holding device), and the machine connector 42m of the tool holder 42 has a shape that allows the machine connector 42m to be mounted on the tool main spindle 18 (the second holding device). Hence, intervention of the tool holder 42 enables compensation for the difference in shape of the tool mount of the tool main spindle 18 and that of the lower tool post 20, so that it is possible to mount on the main spindle 18 the cutting tool 32a dedicated to the lower tool post 20.

Figure 7:
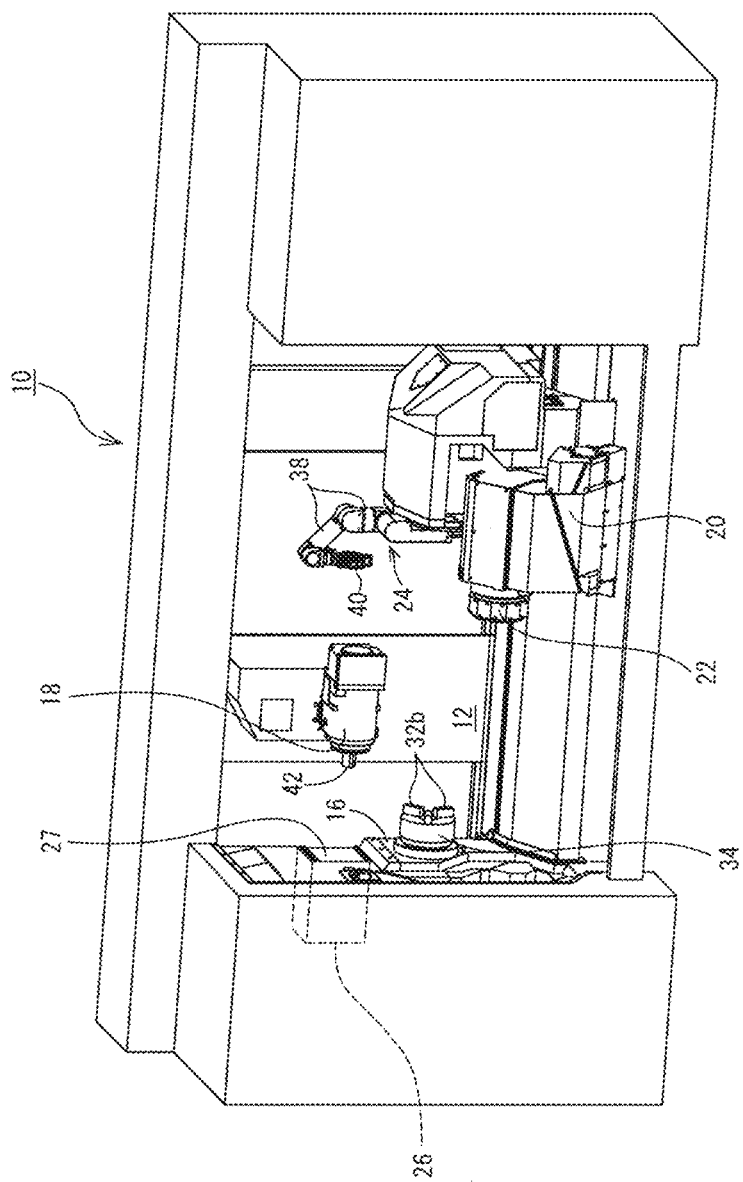
FIG. 7 is a perspective view of a machine tool.
Figure 8:
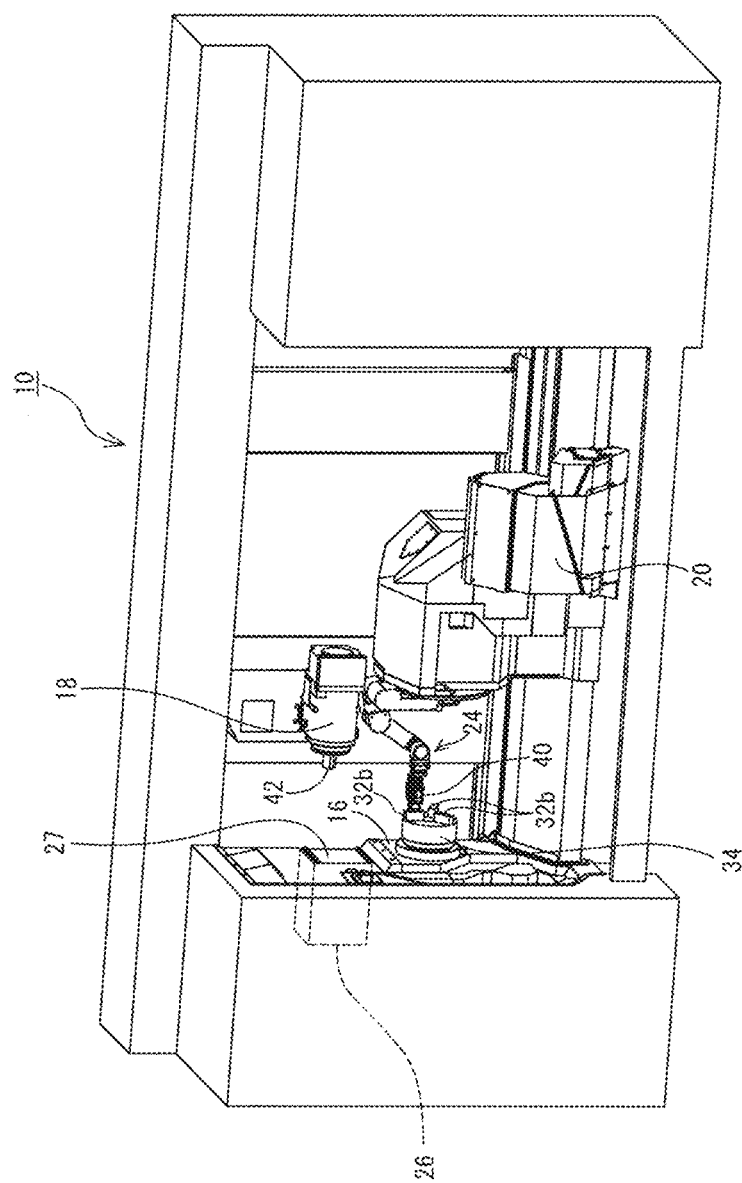
FIG. 8 is a perspective view of a machine tool.
Figure 9:
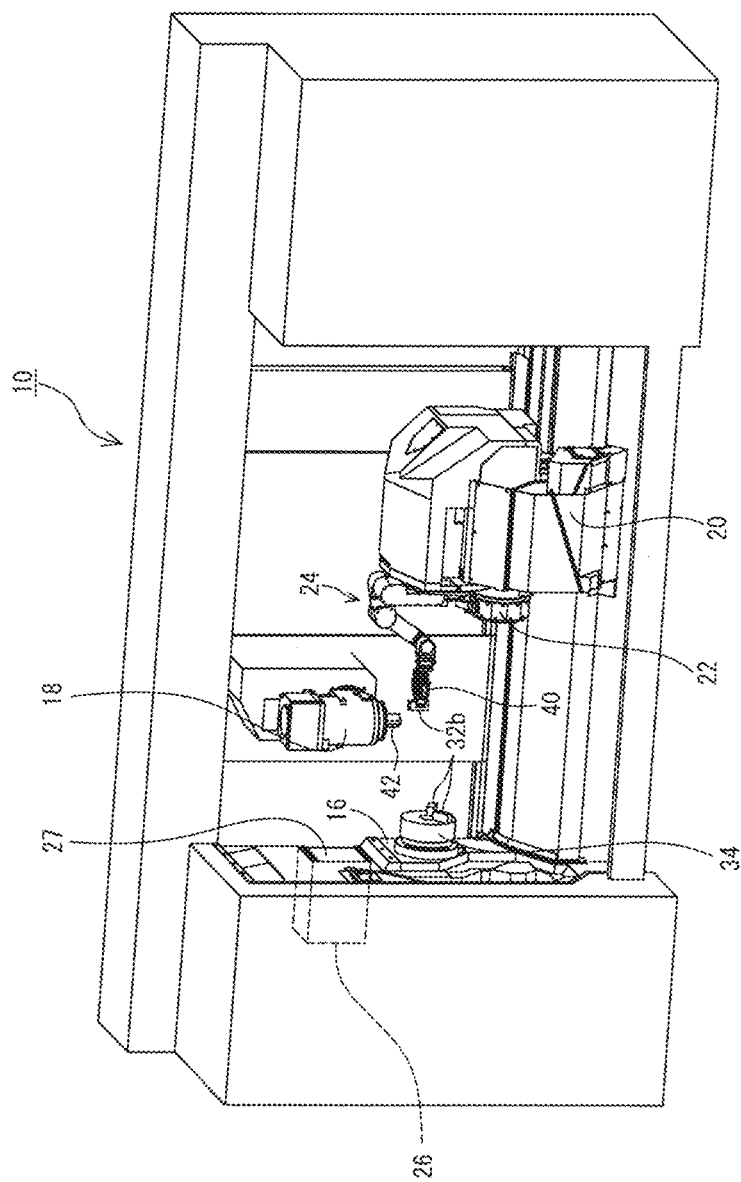
FIG. 9 is a perspective view of a machine tool.
Figure 10:
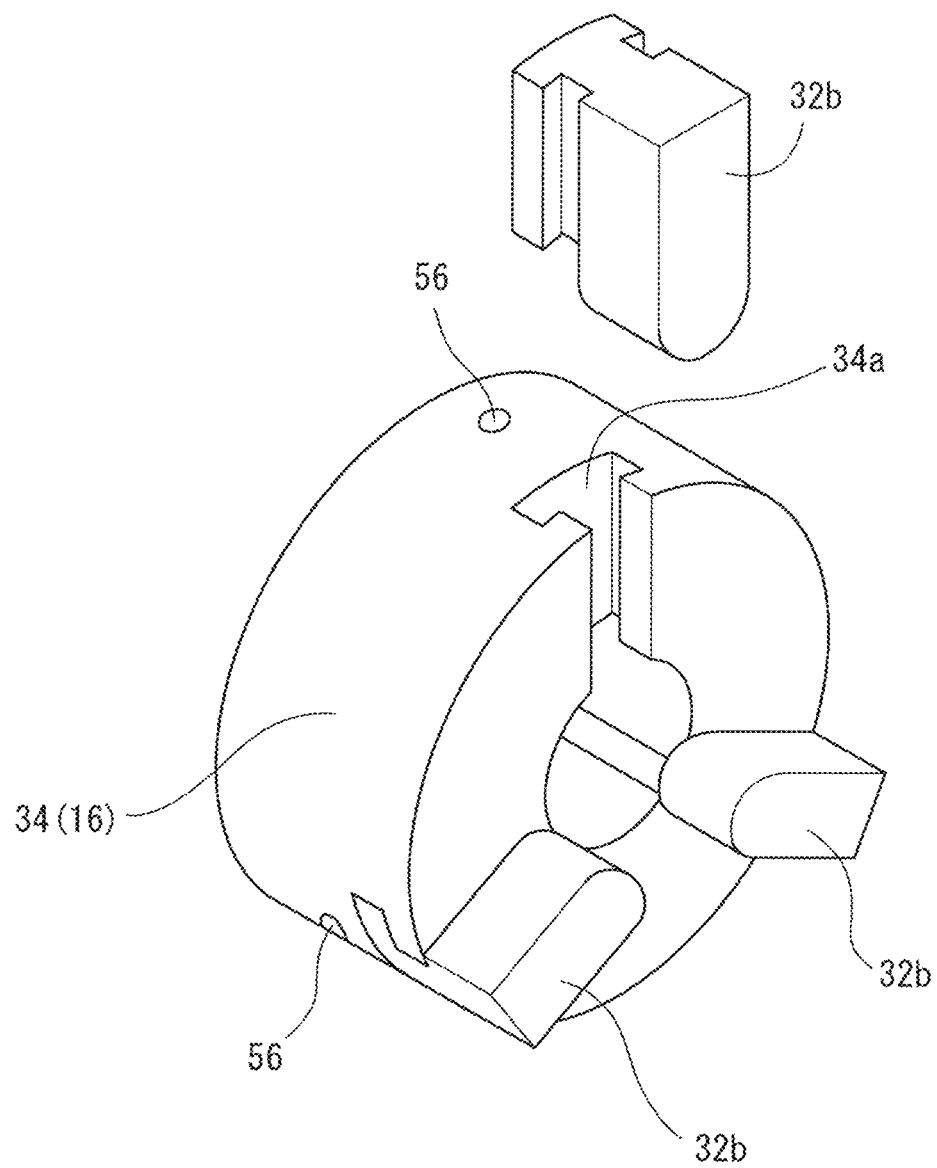
FIG. 10 is a perspective view of the neighborhood of a main spindle end portion.
Figure 11:
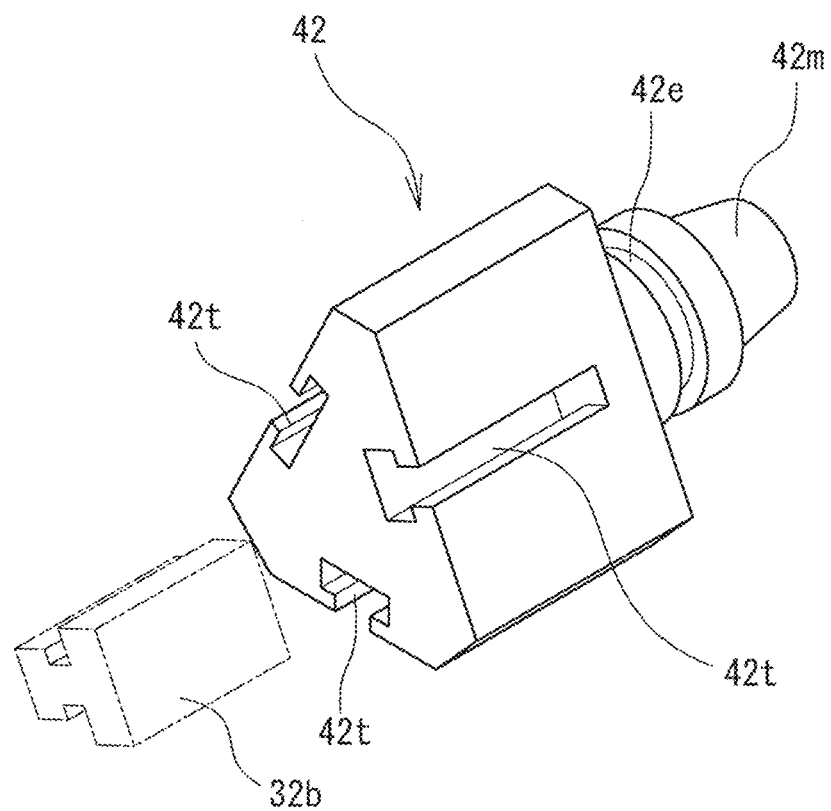
FIG. 11 illustrates another example of a tool holder.

Other embodiments will now be described while referring to FIG. 7 to FIG. 11. FIG. 7 to FIG. 9 are perspective views of the machine tool 10, illustrating exchange of the chuck claws 32b, or one kind of the tool 32. FIG. 10 is a schematic perspective view of the main spindle end 34. FIG. 11 is a perspective view of the tool holder 42 for use in exchange of the chuck claws 32b.

As described earlier, the machine tool 10 has the workpiece main spindle 16, and a plurality of (three in the example illustrated) chuck claws 32b are mounted on an end portion of the workpiece main spindle 16; that is, the main spindle end 34. The chuck claw 32b needs to be exchanged in accordance with the shape of a workpiece to be machined. In this embodiment, the chuck claw 32b is exchanged via intervention of the exchange arm 50, the tool main spindle 18, and the inside robot 24. That is, in this case, the chuck claw 32b functions as the tool 32, while the workpiece main spindle 16 functions as the first holding device that holds the tool 32 and is not accessed by the exchange mechanism 28.

As illustrated in FIG. 10, the main spindle end 34 has an insection 34a extending in the radial direction. The chuck claw 32b will slide into the insection 34a. The insection 34a serves as a tool mount defined on the workpiece main spindle 16 (the first holding device), into which the chuck claw 32b (a tool) is to be inserted. The chuck claw 32b inserted in the insection 34a (a tool mount) is locked with a locking mechanism (not illustrated) that utilizes a spring or an electromagnetic cylinder, to be thereby prevent separation from the main spindle end 34. A lock hole 56 for releasing the locking mechanism is formed on the circumferential surface of the main spindle end 34. With a release pin (not illustrated) inserted into the lock hole 56, the lock mechanism is released, so that the chuck claw 32b can be removed from the main spindle end 34.

Note here that the tool mount (the insection 34a) formed on the main spindle end 34 naturally has a different shape from the tool mount of the tool main spindle 18. To compensate for the difference in shape, the tool main spindle 18 holds the chuck claw 32b via the tool holder 42 illustrated in FIG. 11. Specifically, the chuck claw 32b has the number of tool connecters 42t, which are insections each having the same shape as that of the tool mount (the insection 34a) of the workpiece main spindle 16, the number being the same as the number of the chuck claws 32b (three in this embodiment), in addition to the machine connector 42m adapted to be mounted on the tool mount of the tool main spindle 18 and the engagement unit 42e adapted to be engaged with the exchange arm 50.

Steps for exchanging the chuck claws 32b between the workpiece main spindle 16 (the first holding device) and the storage unit 26 in this machine tool 10 will be described. In this case, the controller 39 initially drives the inside robot 24 to clean around the chuck claw 32b on the workpiece main spindle 16.

Subsequently, the controller 39 drives the inside robot 24 to remove the chuck claw 32b from the workpiece main spindle 16 to mount the chuck claw 32b on the tool holder 42 held on the tool main spindle 18. Specifically, initially, a gripping mechanism (for example, a clipper or a hand mechanism) is mounted on the inside robot 24 as an end effecter 40 to grip the release pin with the gripping mechanism (the end effecter 40) and then to insert the release pin into the lock hole 56 to thereby release the locking mechanism (refer to FIG. 8). With the locking mechanism released, the inside robot 24 is driven to hold the chuck claw 32b with the gripping mechanism, then to remove the chuck claw 32b from the workpiece main spindle 16, and to mount the chuck claw 32b on the tool holder 42 (refer to FIG. 9). In the above, the tool main spindle 18 for holding the tool holder 42 changes its position and posture when necessary. This procedure is repetitively conducted in the same number of times as the number of the chuck claws 32b; namely, three in the example illustrated.

With all chuck claws 32b mounted on the tool holder 42, the controller 39 moves the tool main spindle 18 together with the respective tool holders 42 to a predetermined main spindle-side exchange position. Then, the controller 39 opens the shutter 27 of the storage unit 26 and stores the chuck claws 32b on the tool main spindle 18, in the storage unit 26, together with the tool holders 42, using the exchange arm 50 of the exchange mechanism 28. Simultaneously, a chuck claw 32b to be freshly mounted on the workpiece main spindle 16 is mounted on the tool main spindle 18, by means of the exchange arm 50.

With the chuck claw 32b freshly mounted on the tool main spindle 18, the controller 39 moves the tool main spindle 18 to the inside of the movable range of the inside robot 24, and then drives the inside robot 24 to mount, on the workpiece main spindle 16, the chuck claw 32b on the tool main spindle 18. This completes exchange of the chuck claws 32*b* between the workpiece main spindle 16 and the storage unit 26.

As is obvious from the above description, tools (the chuck claws 32*b*) are exchanged via the tool main spindle 18 also in this embodiment. This structure enables automatic exchange of tools also with respect to the workpiece main spindle 16 (the first holding device), which cannot move relative to the storage unit 26, while preventing increase in cost and dimensions.

Figure 12:
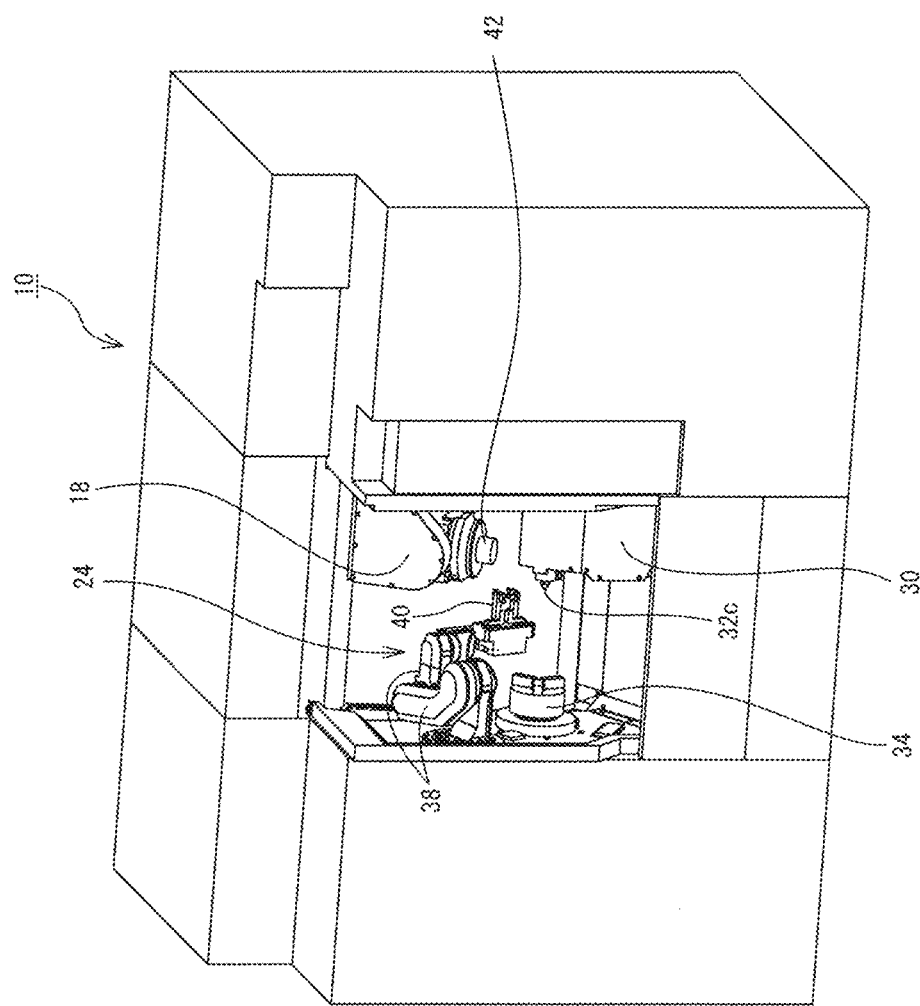
FIG. 12 is a perspective view of another machine tool.
Figure 13:
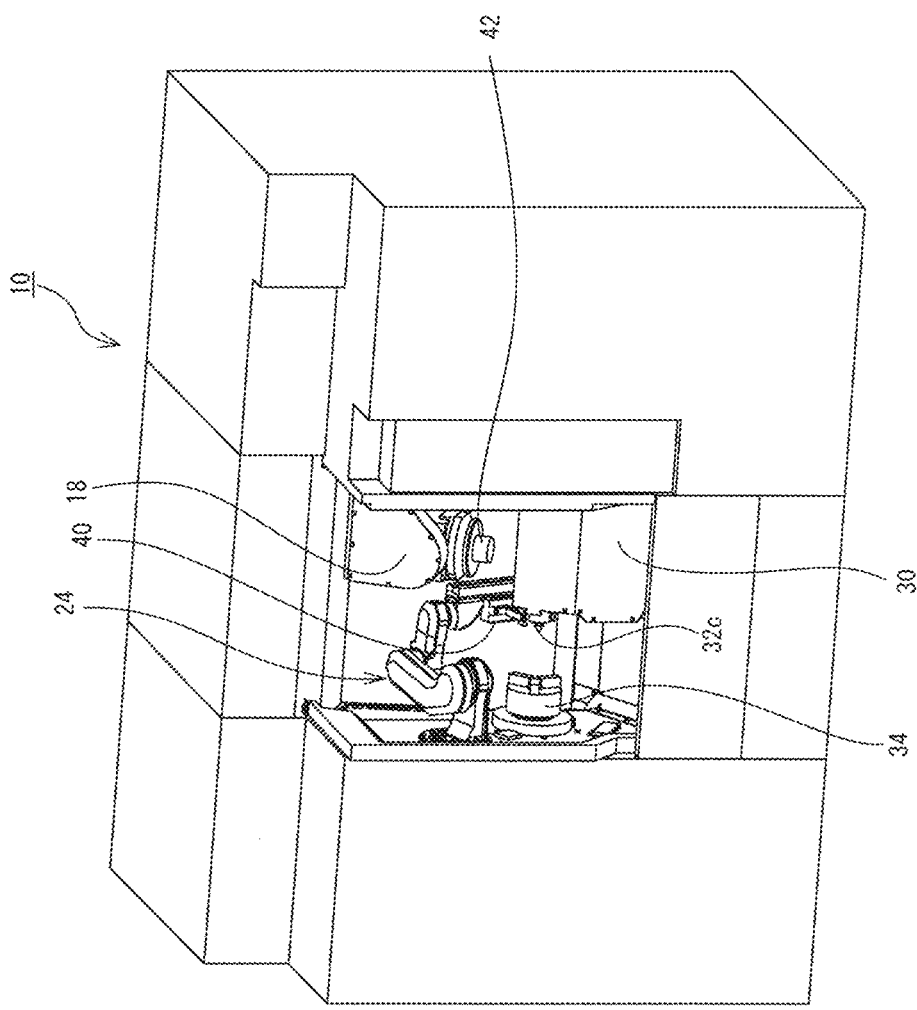
FIG. 13 is a perspective view of another machine tool.
Figure 14:
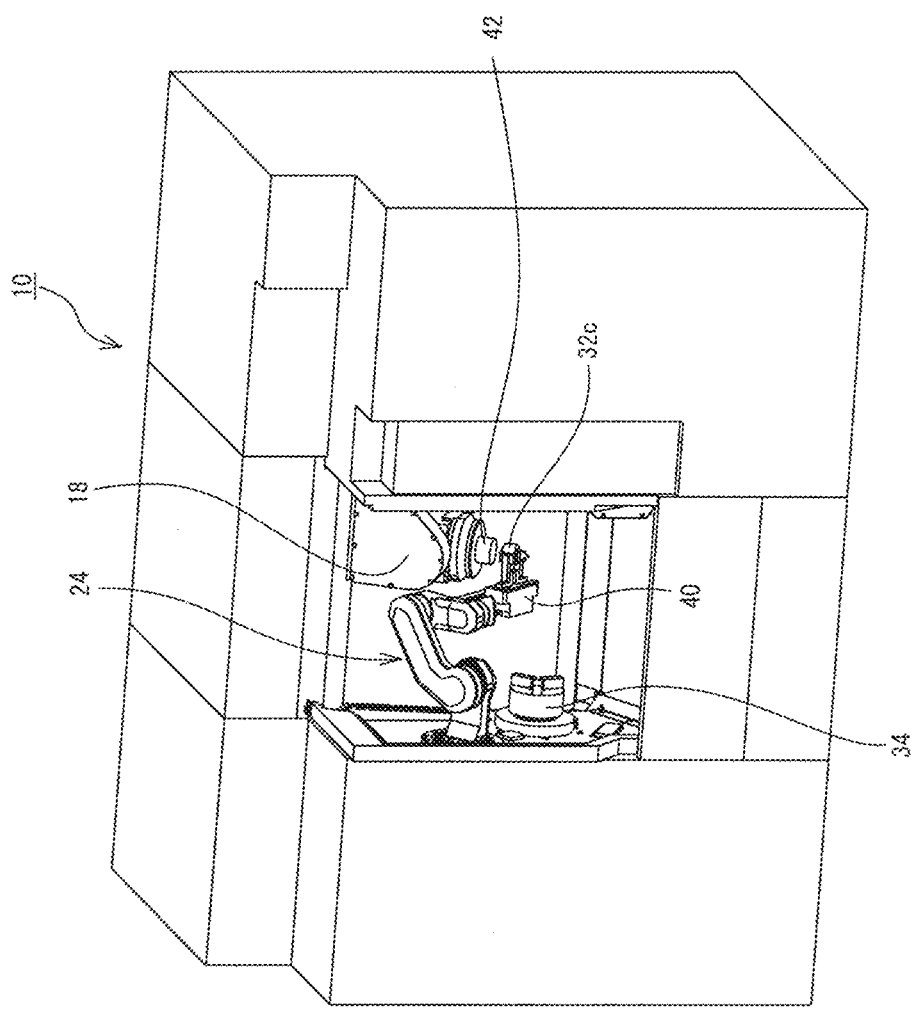
FIG. 14 is a perspective view of another machine tool.

Other embodiments will now be described while referring to FIG. 12 to FIG. 14. FIG. 12 to FIG. 14 are perspective views of another machine tool 10, illustrating exchange of a tailstock tool 32*c*, or one kind of the tool 32. The machine tool 10 in this embodiment has a tailstock 30, instead of the lower tool post 20, as is obvious from FIG. 12 to FIG. 14. The tailstock 30 is disposed opposed to the workpiece main spindle 16 in the Z axial direction, and is movable in the Z axial direction. On one end of the tailstock 30, the tailstock tool 32*c* is removably mounted. The tailstock tool 32*c* abuts on the tip end of a workpiece held on the workpiece main spindle 16 to thereby support the workpiece. In this embodiment, the tailstock 30 functions as a first holding device that holds the tool 32 (the tailstock tool 32*c*).

In this embodiment, the tool main spindle 18 functions as the second holding device that relays exchange of tools (the tailstock tool 32*c*). On the tool main spindle 18, there is mounted the tool holder 42 that removably holds the tailstock tool 32*c*.

Steps of exchanging tailstock tools 32*c* between the tailstock 30 (the first holding device) and the storage unit 26 in the machine tool 10 will be described. In this case, the controller 39 initially drives the inside robot 24 to clean around the tailstock tool 32*c* mounted on the tailstock 30.

Then, the controller 39 drives the inside robot 24 to demount the tailstock tool 32*c* from the tailstock 30, and then mount the tailstock tool 32*c* on the tool holder 42 held on the tool main spindle 18 (refer to FIG. 13 and FIG. 14). With the tailstock tool 32*c* mounted on the tool main spindle 18, the controller 39 moves the tool main spindle 18, together with the tool holder 42, to a predetermined main spindle-side exchange position. Then, the controller 39 opens the shutter 27 of the storage unit 26 (not illustrated in FIG. 12 to FIG. 14), and stores the tailstock tool 32*c* on the tool main spindle 18, in the storage unit 26, together with the tool holder 42, using the exchange arm 50 of the exchange mechanism 28 (refer to FIG. 5). Simultaneously, the exchange arm 50 mounts, on the tool main spindle 18, a tailstock tool 32*c* to be freshly mounted on the tailstock 30.

With the tailstock tool 32*c* freshly mounted on the tool main spindle 18, the controller 39 moves the tool main spindle 18 to the inside of the movable range of the inside robot 24, and drives the inside robot 24 to mount, on the tailstock 30, the tailstock tool 32*c* on the tool main spindle 18. This completes exchange of the tailstock tools 32*c* between the tailstock 30 and the storage unit 26.

As is obvious from the above description, tools (tailstock tools 32*c*) are exchanged via the tool main spindle 18 also in this embodiment. This structure enables automatic exchange of tools also with respect to the tailstock 30 (the first holding device), which is disposed remotely from the storage unit 26, while preventing increase in cost and dimensions.

Figure 15:
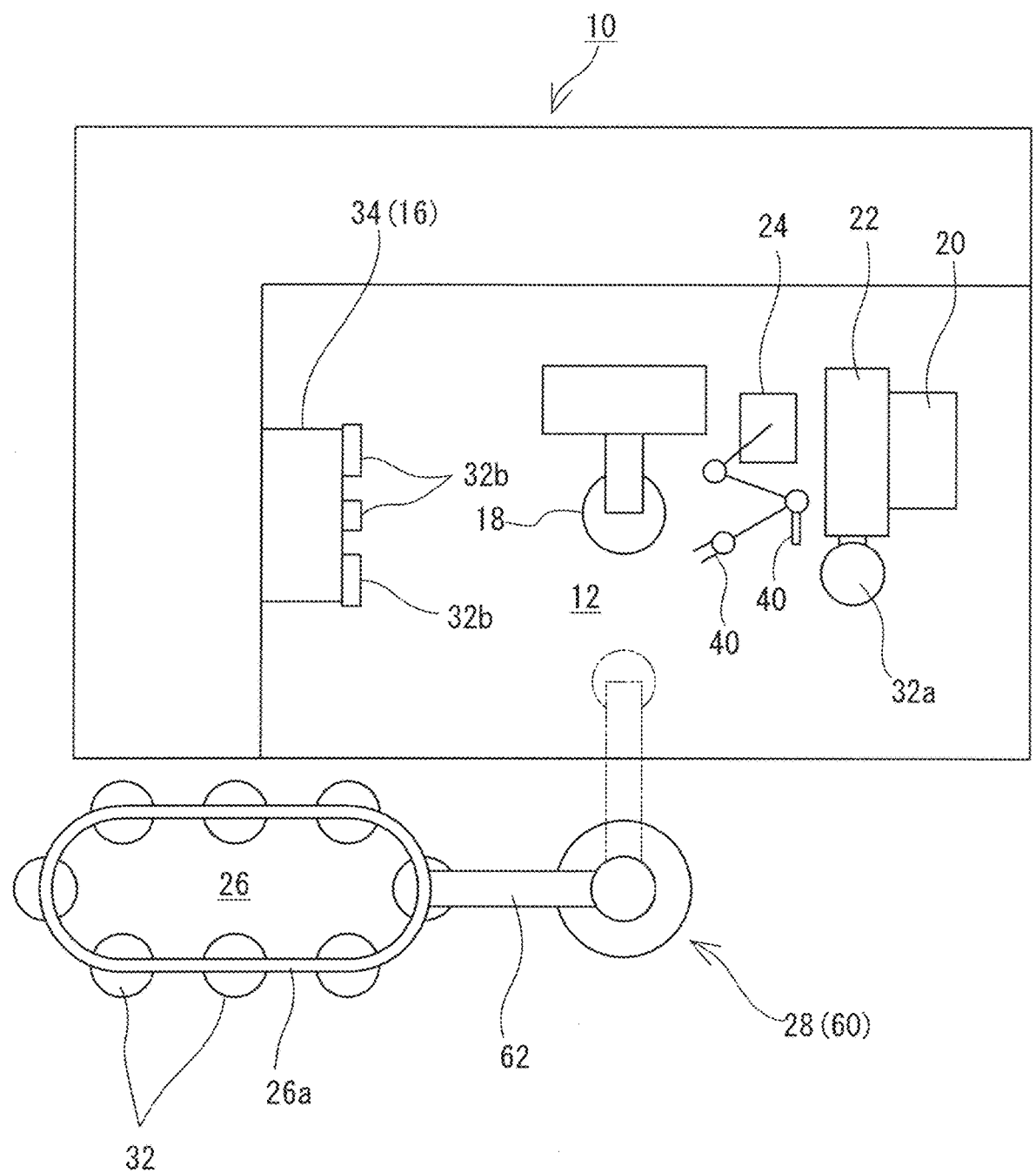
FIG. 15 is a schematic plan view of another machine tool.

Although in the above description the exchange mechanism 28 and the storage unit 26 are disposed inside the machining chamber 12, these may be disposed outside the machining chamber 12. FIG. 15 is a schematic plan view of such a machine tool 10. In the example illustrated in FIG. 15, the storage unit 26 is disposed outside the machining chamber 12. In the storage unit 26, a plurality of tools 32 are held so as to be movable along an annular rail 26*a*. The exchange mechanism 28 is disposed outside the machining chamber 12, and includes a robot 60 having a rotation arm 62. The rotation arm 62 rotates about a predetermined axis to thereby access both the storage unit 26 and the machining chamber 12. In exchanging the tools 32, the lower tool post 20 disposed inside the machining chamber 12 moves to the neighborhood of the rotation arm 62.

The above-described structures are mere examples, and structures other than a structure for exchanging the tools 32 between the first holding device and the storage unit 26 via the inside robot 24, the second holding device, and the exchange mechanism 28 can be desirably modified. For example, the second holding device may be any holding device that holds the tool 32, not being limited to the tool main spindle 18. In the case where an existent ATC is used as the exchange mechanism 28, the second holding device may be a cutting tool holding device that holds the cutting tool 32*a* to be exchanged by the ATC. Also, although a cleaning mechanism (the end effecter 40) mounted on the inside robot 24 is used to clean around the tool 32 held by the first holding device, such a cleaning mechanism may be provided separately from the inside robot 24. For example, a mechanism for supplying cutting oil and air to where machining is ongoing, which is generally equipped to the machine tool 10, may be used as a cleaning mechanism.

REFERENCE SIGNS LIST

10 machine tool, 12 machining chamber, 14 front door, 16 workpiece main spindle, 18 tool main spindle, 20 lower tool post, 22 turret, 24 inside robot, 26 storage unit, 27 shutter, 28 exchange mechanism, 30 tailstock, 32 tool, 32*a* cutting tool 32*b* chuck claw, 32*c* tailstock tool, 34 main spindle end, 38 robot arm, 39 controller, 40 end effecter, 42 tool holder, 42*e* engagement unit, 42*m* machine connector, 42*t* tool connecter, 48 tool magazine, 50 exchange arm, 52 engagement hook, 56 lock hole, 60 robot, 62 rotation arm.

The invention claimed is:

1. A machine tool for machining a workpiece, by means of a cutting tool, the machine tool comprising:
    a first holding device installed in a machining chamber, the first holding device being for holding a tool;
    a second holding device installed in the machining chamber, the second holding device being for holding the tool, the second holding device configured to move independently of the first holding device to change a position of the second holding device;
    a storage unit for storing one or more tools;
    an exchange mechanism for exchanging the tool and another tool of the one or more tools between the second holding device and the storage unit, the exchange mechanism being unable to directly access the first holding device;
    a robot for picking up the tool and for mounting the picked-up tool; and
    a controller for controlling driving of the first holding device, the second holding device, the exchange mechanism, and the robot,
    wherein
    the exchange mechanism exchanges the tool and the another tool of the one or more tools between the second holding device and the storage unit without involving the robot, the second holding device is a tool main spindle that holds the cutting tool as the tool, the exchange mechanism is an automatic tool changer including at least one of an exchange arm and a robot arm, the first holding device is a tool post that holds the cutting tool as the tool and is movable along a first direction and a second direction that is orthogonal to the first direction, the controller performs control such that the tool and the another tool are moved to and from the first holding device and the storage unit via the robot, the second holding device, and the exchange mechanism, and the controller is configured to control the robot such that the robot picks up the tool from the first holding device and mounts the picked-up tool on the second holding device, and the controller is further configured to control the robot such that the robot picks up the tool from the second holding device and mounts the picked-up tool on the first holding device.

2. The machine tool according to claim 1, wherein the second holding device holds the tool previously held by the first holding device via a tool connecter having the same shape as a tool mount of the first holding device, and a machine connector adapted to be connected to a tool mount of the second holding device.

3. The machine tool according to claim 1, further comprising a cleaning mechanism for cleaning around the tool held on the first holding device, wherein the controller causes the cleaning mechanism to clean around the tool held by the first holding device prior to exchange of the tool held by the first holding device and the another tool of the storage unit via the robot, the second holding device, and the exchange mechanism.

4. The machine tool according to claim 1, wherein the robot includes one or more end effecters exchangeably mounted on the robot.

5. The machine tool according to claim 4, wherein the end effecter, among the one or more end effecters, to be mounted on the robot is selected from a group including an end effecter for gripping an object and an end effecter for cleaning around the tool held on the first holding device.

* * * * *